US007840638B2

(12) United States Patent
Zhang et al.

(10) Patent No.: US 7,840,638 B2
(45) Date of Patent: Nov. 23, 2010

(54) PARTICIPANT POSITIONING IN MULTIMEDIA CONFERENCING

(75) Inventors: Zhengyou Zhang, Redmond, WA (US); Xuedong David Huang, Bellevue, WA (US); Zicheng Liu, Bellevue, WA (US); Cha Zhang, Sammamish, WA (US); Philip A. Chou, Bellevue, WA (US); Christian Huitema, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 12/147,603

(22) Filed: Jun. 27, 2008

(65) Prior Publication Data

US 2009/0327418 A1 Dec. 31, 2009

(51) Int. Cl.
*G06F 15/16* (2006.01)
*G06F 12/00* (2006.01)
(52) U.S. Cl. .......................... 709/204; 709/250
(58) Field of Classification Search ......... 709/204–205, 709/250, 217–219
See application file for complete search history.

(56) References Cited

U.S. PATENT DOCUMENTS

| | | | |
|---|---|---|---|
| 5,991,385 A * | 11/1999 | Dunn et al. | 379/202.01 |
| 6,466,250 B1 | 10/2002 | Hein et al. | |
| 6,583,808 B2 | 6/2003 | Boulanger et al. | |
| 6,853,398 B2 | 2/2005 | Malzbender et al. | |
| 7,106,358 B2 | 9/2006 | Valliath et al. | |
| 7,586,513 B2 * | 9/2009 | Muren et al. | 348/14.01 |
| 7,626,569 B2 * | 12/2009 | Lanier | 345/156 |
| 2003/0197779 A1 | 10/2003 | Zhang et al. | |
| 2003/0218672 A1 | 12/2003 | Zhang et al. | |
| 2005/0008169 A1* | 1/2005 | Muren et al. | 381/92 |
| 2005/0168402 A1 | 8/2005 | Culbertson et al. | |
| 2007/0070177 A1 | 3/2007 | Christensen | |
| 2007/0263080 A1 | 11/2007 | Harrell et al. | |

OTHER PUBLICATIONS

Schreer, et al., "A Comparative Study on Disparity Analysis Based on Convergent and Rectified Views", "The 11th British Machine Vision Conference, 2000", retrieved at <<http://www.bmva.ac.uk/bmvc/2000/papers/p56.pdf>>, Sep. 11-14, 2000, pp. 1-10.
"Inderscience Publishers", "A Review of Telecollaboration Technologies with Respect to Closely Coupled Collaboration", retrieved at <<http://inderscience.metapress.com/app/home/ contribution. asp?referrer=parent& backto=issue,2,9;journal,4,52;linking publicationresults,1:110840,1>>, Feb. 18, 2008, p. 1-1.
Childers, et al., "Access Grid: Immersive Group-to-Group Collaborative Visualization", retrieved at <<www-fp.mcs.anl.gov/fl/publications-electronic-files/ag-immersive-group-821.doc>>, pp. 1-9.

(Continued)

*Primary Examiner*—Zarni Maung

(57) ABSTRACT

A multimedia conference technique is disclosed that allows physically remote users to participate in an immersive telecollaborative environment by synchronizing multiple data, images and sounds. The multimedia conference implementation provides users with the perception of being in the same room visually as well as acoustically according to an orientation plan which reflects each remote user's position within the multimedia conference environment.

20 Claims, 9 Drawing Sheets

OTHER PUBLICATIONS

Vertegaal, Roel., "The GAZE Groupware System: Mediating Joint Attention in Multiparty Communication and Collaboration", "In the Proceedings of ACM CHI'99 Conference on Human Factors in Computing Systems", retrieved at <<http://www.cs.queensu.ca/home/roel/publications/chi99/gaze.pdf>>, pp. 1-8, (1999).

Nguyen, et al., "MultiView: Spatially Faithful Group Video Conferencing", "CHI 2005", retrieved at <<http://guir.berkeley.edu/pubs/chi2005/multiview.pdf>>, Apr. 2-7, 2005, pp. 1-10.

Quante, et al., "Eye-contact in Multipoint Videoconferencing", retrieved at <<http://www.hft.org/HFT99/paper99/Work/13_99.pdf>>, pp. 1-9, (1999).

* cited by examiner

PARTICIPANT POSITIONING IN MULTIMEDIA CONFERENCING

BACKGROUND

Video camera and audio systems have been developed for improving communication among individuals who are separated by distance and/or time. These systems and the process are generally referred to as "videoconferencing". Videoconferencing seeks to emulate the range, level, and intensity of interpersonal communication and information sharing that would occur if the people or meeting participants were "face-to-face" in the same room at the same time.

Conventional videoconferencing systems provide video conference participants located at different locations with only an incomplete simulation of the perception or feeling of being in the same physical space. Typically, a videoconference system includes one or more standard definition cameras, and one or more television-sized monitors in each room. The overall approach is simply to enable participants in each room to see each other on their respective video monitors, much like watching television. Where the camera is set to capture an image of the entire room, the participants in that room often appear small and remote to the viewers in the destination room. Where the camera is zoomed to capture the face of one or the participants, then it appears oversized in scale, and without any of the context of the rest of the participants. In particular, the viewers in the remote room cannot see the reactions, body language or other activity of the participants in the source room when the camera is zoomed in on only one of the participants there. Overall, no effort is made to create the perception of a single shared physical space between the participants where participants in both rooms can see the entire other room in a realistic and properly scaled fashion.

Further, conventional videoconferencing systems are not conducive to how individuals normally interact in a group setting, such as in a group meeting, with respect to eye contact with each other, use of body language, and other non-verbal cues. As a result, participants rely primarily on voice communication and less on useful visual information and cues in order to communicate and thereby fail to convey much of the emotional content experienced with "in-person" meetings.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, techniques are described for synchronizing within a multimedia conference multi-source data, images and sounds to provide a single seamless, immersive telecollaborative environment for a plurality of participants respectively located in a plurality of different locations. This permits multiple participants to experience simulated immersion in a real meeting. Furthermore, although the participants are physically separated from each other, the images of each participant appear in the space of each other participant, and synchronized, integrated stereo sound provides a sensation of juxtaposition with other participants in the meeting. The systems and methods may be configured to run on personal computers (e.g. desktop, laptop, etc.).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
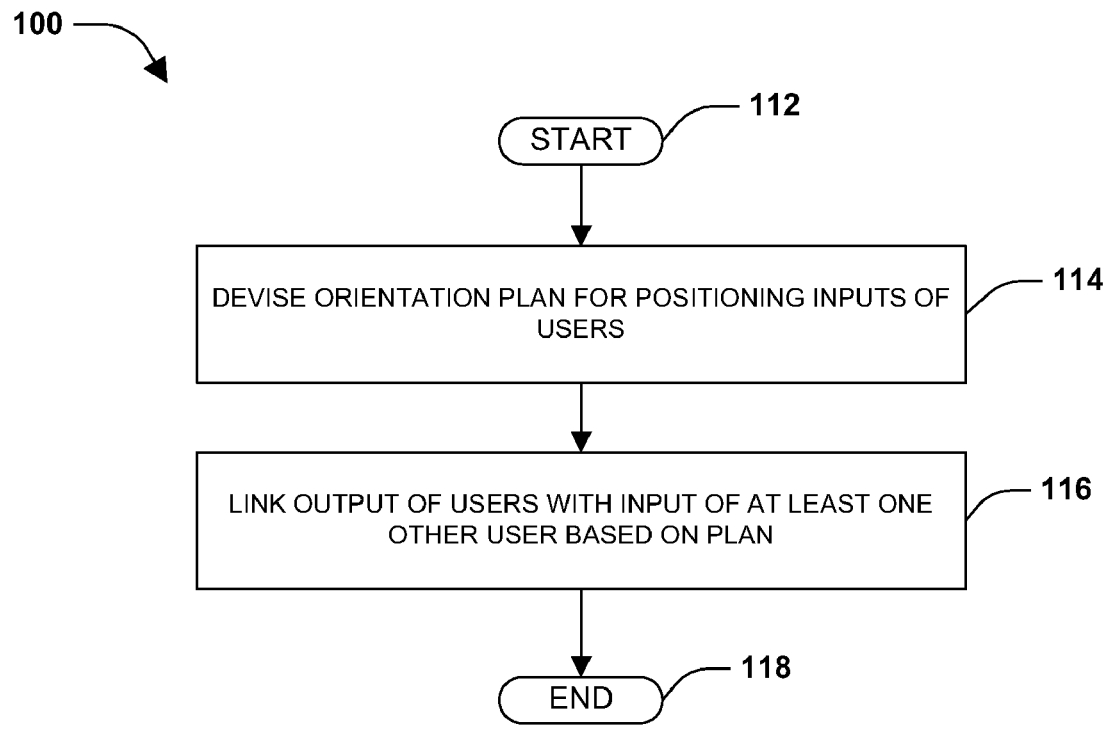
FIG. 1 is a flow chart illustrating an exemplary method of using a multimedia conferencing system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Video and telephone conferencing have been widely used technologies to address the scenario wherein remotely located participants to work together and share information. The overall approach of conventional videoconferencing systems is to enable participants in each room to see each other on their respective displays. Such multimedia conferencing tools are constrained, however, in that they do not allow for telepresence, which is generally defined as the experience of presence in an environment by means of communication medium. Participants do not obtain the realistic feel of eye contact or hand gestures, among others.

Further, the television-to-television model of videoconferencing systems is not conducive to the normal interaction of individuals in a group setting, such as in a group meeting. In actual physical meetings, individuals make eye contact with each other and use body language and other non-verbal cues (user posture). The typical arrangement of a conventional video conference room all but makes realistic eye contact between individual participants impossible, and either overly exaggerates or suppresses body language and other non-verbal cues. A participant does not experience realistic eye contact when looking at the enlarged face of another person on a television monitor or the display of an entire source room which may hold multiple participants. The result is a rather primitive form of videoconferencing where participants rely primarily on voice and much less on useful visual information and cues in order to communicate, and which thereby fails to convey much of the emotional content experienced with "in-person" meetings.

By utilizing an orientation plan for a multimedia conference, users are provided with the perception of a shared work environment and can effectively communicate and interact with one another as if they were actually meeting and working in person. The orientation plan may be implemented on personal computer configurations (e.g. desktops, laptops, etc.)

FIG. 1 illustrates a flowchart diagram of an exemplary method 100 by which one or more users may participate in a multimedia conference (MMC) using an orientation plan. The exemplary method 100 begins at 112, and involves devising an orientation plan for positioning inputs of user groups at 114. The exemplary method also involves at 116 linking of outputs of users with inputs of at least one other user based on the orientation plan. Having achieved orientation of user groups in the multimedia conference, the exemplary method 100 ends at 118.

A user group may comprise users and a device (group of input and output devices, such as monitor, speaker, keyboard, microphone, camera, etc.). An orientation plan may be devised to position multiple remote users with multiple input and output devices connected to each other to create a semi-immersive multimedia conference (MMC) environment. An example of method 100 is where a first remote user and second remote user each have a microphone, input device, which records audio data and produces an output signal of the audio data. A third remote user has two speakers. In devising an orientation plan, the audio output signal from the first remote user may be mapped to the third remote user's left speaker. The audio output signal from the second remote user may be mapped to the third remote user's right speaker. The advantage of this orientation plan is the creation of the perception that the first remote user is on the left and the second remote user is on the right of the third remote user. The orientation plan may configure the same mapping orientation for video output from the first remote user and second remote user to the third remote user.

An example of a system for devising an orientation plan may be a device (e.g. server, host computer, a remote user computer, etc.) that each remote user connects to (e.g. via an Internet connection). Each remote user may send information to the device, such as IP address, available input devices, available output devices, user specified position (relationship of remote user to other remote users), internet connection rate, and/or any other relevant information used to devise an orientation plan. The device may then take the information from each remote user and configure each remote user's output signals (e.g. camera, microphone, stylus outputs, etc.) to each remote user's input (e.g. monitor, speaker, lightbars, etc.).

The configuration may comprise mapping specific inputs and outputs to create an orientation plan that positions the remote users in such a way that creates a user experience emulating a "person to person" conference (e.g. each user perceives the other users as if they were located around a large conference table). The environment may provide a user the visual experience viewing (through one or more monitors and speakers) two remote users facing and communicating with each, as if they were in a "face to face" conversation. The goal of the orientation plan is to provide an environment that emulates the remote user participants as if they were sitting in person around a conference table.

After inputs and outputs of users have been linked, the multimedia conference may be facilitated through a common software user interface. The common software user interface may be an application installed on at least one (or every) user's computer. The common software user interface may facilitate the multimedia conference by providing an interactive environment for a user to participate within the multimedia conference. The common software user interface may also control the input and output devices (e.g. turn a lightbar on and off, render video output signals within the computing environment, and any other management of input and/or output devices that provide a multimedia conference environment).

Figure 2:
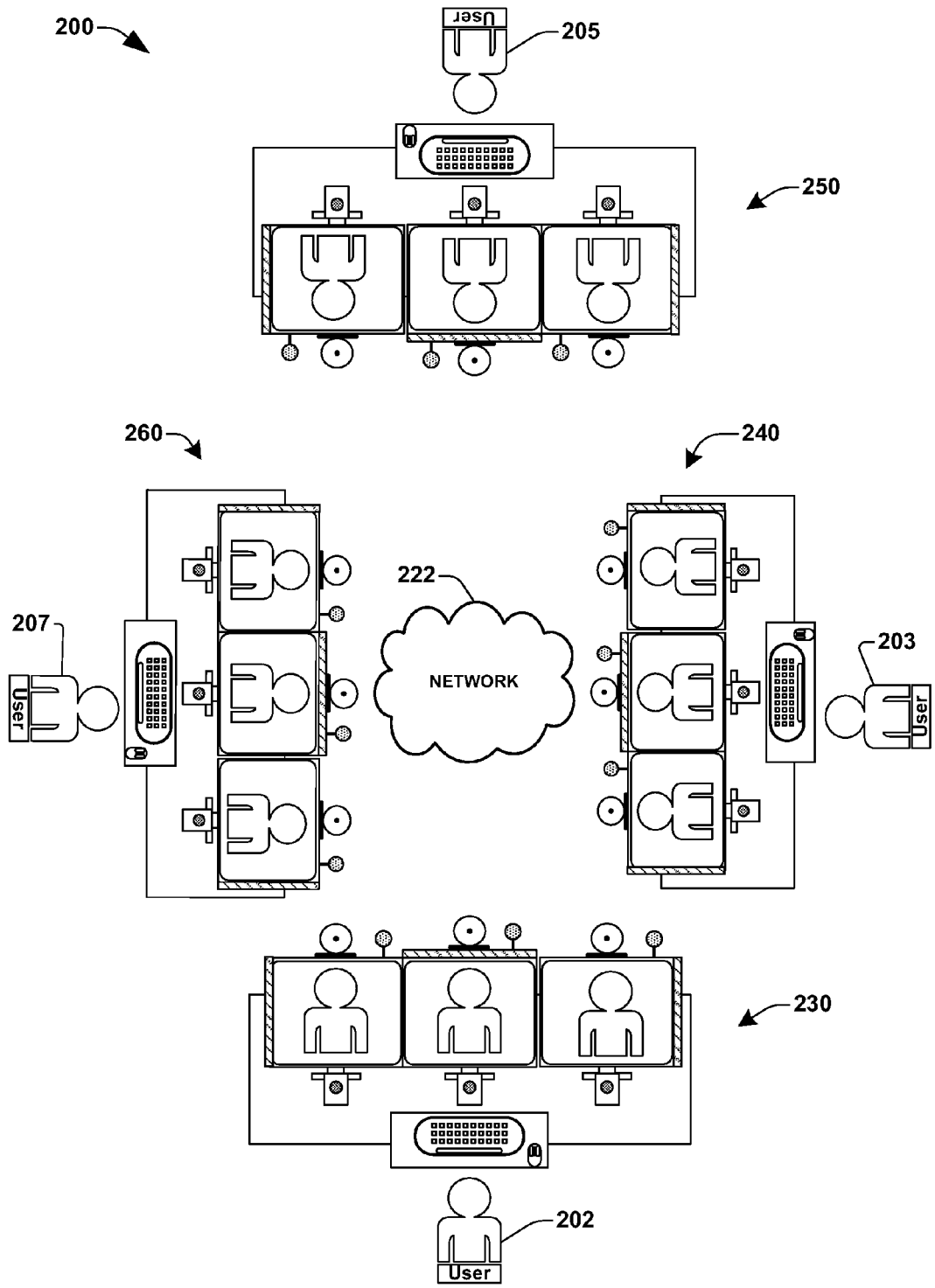
FIG. 2 is an illustration of an exemplary multimedia conferencing system having four users.

FIG. 2 illustrates a graphical display of an exemplary orientation 200 for users remote from one another participating in a multimedia conference (MMC) having four participants or users 202, 203, 205, 207. Although four users 202, 203, 205, 207 are illustrated, with one user at each remote location, it is contemplated that, in an alternative embodiment, additional users may participate from each remote location, with at least one user at each remote location, and the number of users comprising from at least two up to about 10 or more users. Further, in another embodiment, additional remote locations may participate in the MMC.

The arrangement 200 comprises, for example, MMC devices 230, 240, 250, 260 which may establish and facilitate participation of the users 202, 203, 205, 207 in the MMC. As discussed further below with regard to FIG. 3, such devices may include at least one set of inputs, such as: microphones 310, 322, and 330; cameras 312, 313, and 315; a keyboard 304; mouse 318; stylus 314; and tablet 316. Cameras 312 may comprise any suitable hardware and/or software to facilitate capturing an image and/or video of users, as well as providing the image and/or video to other users as an output signal. Devices 230, 240, 250, 260 may further comprise at least one set of outputs, for example: lightbars 308; speakers 306, 324, and 332; visual displays 309, 320, and 326; and the like. Audio and visual information generated by users 202, 203, 205, 207 using devices 230, 240, 250, 260 are mutually communicated amongst devices 230, 240, 250, 260, through network communication component 222. Network communication component 222 represents communication equipment, including hardware and any appropriate controlling logic, for interconnecting devices 230, 240, 250, 260 coupled to network and facilitating communication between remote locations. Network may include a local area network (LAN), a metropolitan area network (MAN), a wide area network (WAN), any other public or private network, a local, regional, or global communication network, an enterprise intranet, other suitable wireline or wireless communication link, or any combination of the preceding. Network may include any combination of gateways, routers, hubs, switches, access points, base stations, and any other hardware, software, or a combination of the preceding that may implement any suitable protocol or communication.

Figure 3:
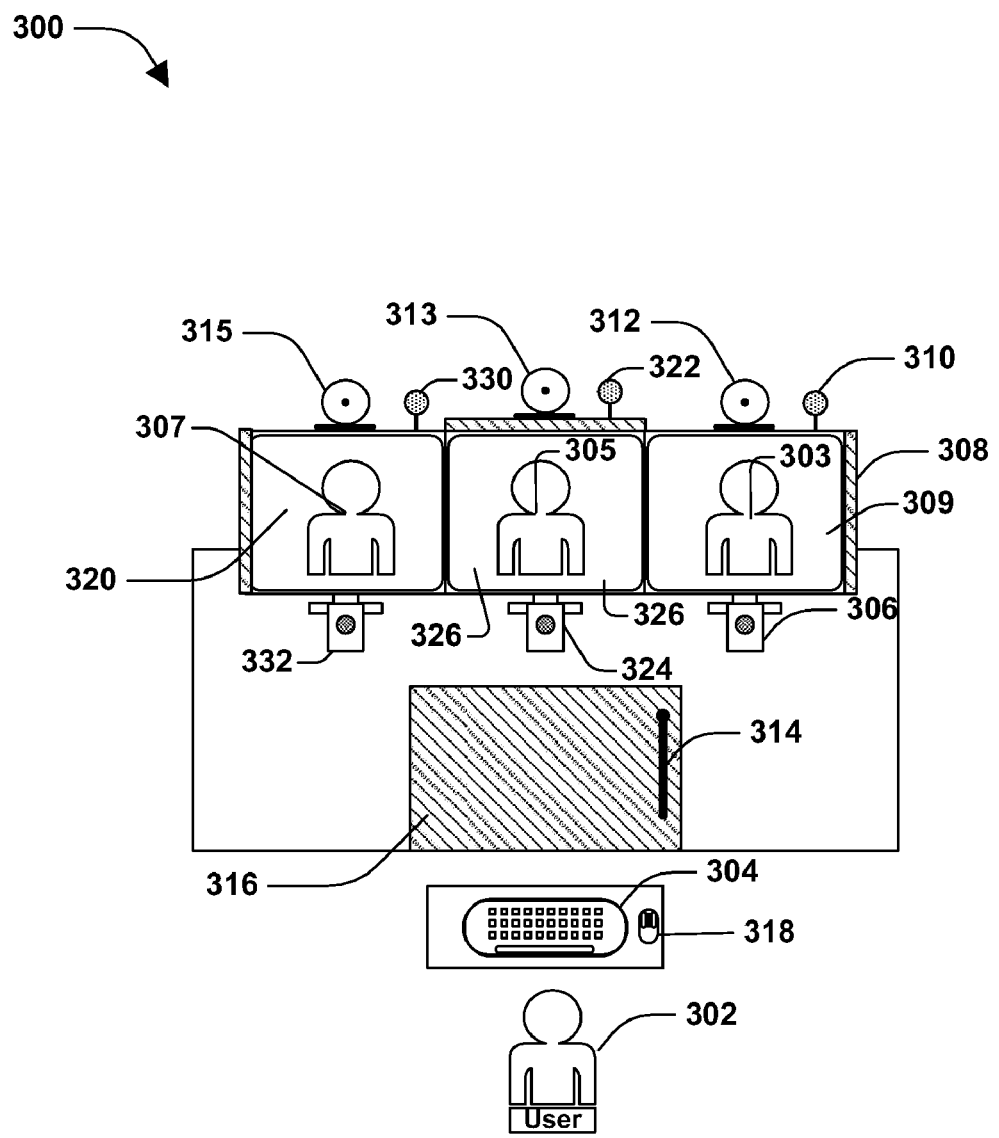
FIG. 3 is a detailed illustration of one embodiment of an exemplary application of a multimedia conferencing system.

In FIG. 3 there is illustrated an embodiment of an orientation for a detailed device 300 for participation in a MMC (e.g., device 230 as illustrated in FIG. 2). By way of example, each of the devices 230, 240, 250, 260 from FIG. 2 has similar structures and explanation for each individual device will be omitted. It may be appreciated that each device 230, 240, 250, and 260 may have different structures and orientations.

Device 300 comprises user 302 output devices (which generate audio/visual experiences based upon output signals from other users): visual displays 309, 326, and 320; and speakers 306, 324, and 332 outputs. Device 300 also comprises user 302 input devices (which produce output signals): microphones 310, 322, and 330; cameras 312, 313, and 315; stylus 314; tablet 316; keyboard 304; and mouse 318 inputs. An example of a devised orientation plan involving user 302 and user 303 is: user 302 receives audio output signal from user 303, which is mapped (oriented) to speaker 306 based upon user 303 orientation to the right of user 302. The visual output signal from user 303 is mapped to monitor 309 based upon the spatial orientation of user 303 being to the right of user 302.

An example of a devised orientation plan involving user 302 and user 305 is: user 302 receives audio output signal from user 305, which is mapped (oriented) to speaker 324 based upon user 305 orientation being across from user 302. The visual output signal from user 305 is mapped to monitor 326 based upon the spatial orientation of user 305 being across from user 302. Likewise, image and sound data transmitted from remote user 307 will be produced on visual display 320 and speaker 332.

The orientation plan provides a MMC environment where user 302 perceives user 303 on the right, user 320 on the left, and user 305 in front of user 302. This orientation plan may provide user 302 audio and visual feedback that allows user 302 to perceive user 303 turn and communicate with user 305 through lighting, speaker setup, and the visual image of 303 turning towards the visual image of user 305. Similarly, the orientation plan may position the output signals (generated from the input devices of user 302) from user 302 to the output devices of user 303, 305, and 320.

Figure 4:
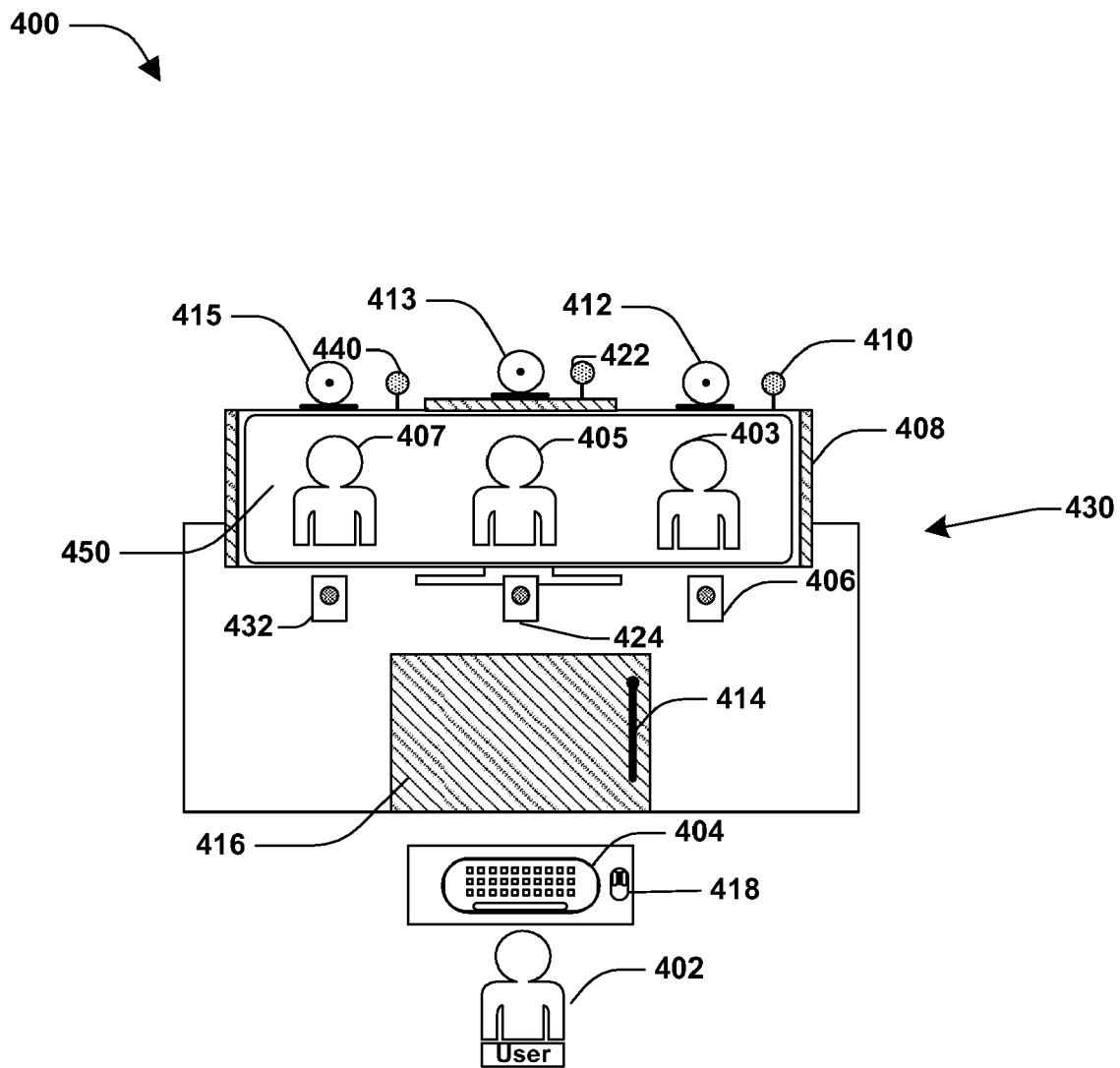
FIG. 4 is an illustration of an alternative embodiment of an application of a multimedia conferencing system having multiple display devices.

In one embodiment, users 202, 203, 205, 207 will have corresponding devices for participation in the MMC. In an alternative embodiment, inputs and outputs of users 202, 203, 205, 207 may be varied by type of inputs and outputs or by the number of inputs and outputs. For example, in FIG. 4, there is illustrated an alternative embodiment of an orientation 400. Rather than an individual display for each user 403, 405, 407, device 430 includes a single display 450 on which image data from users 403, 405, 407 is produced. Device 430 further includes speaker 406 output, and microphone 410 and camera 412 inputs oriented to remote user 403; speaker 424 output and microphone 422 and camera 413 inputs oriented to remote user 405, and speaker 432 output and microphone 440 and camera 415 inputs oriented to remote user 407. User 402 is equipped with keyboard 404, stylus 414, tablet 416 and mouse 418 inputs.

Figure 5:
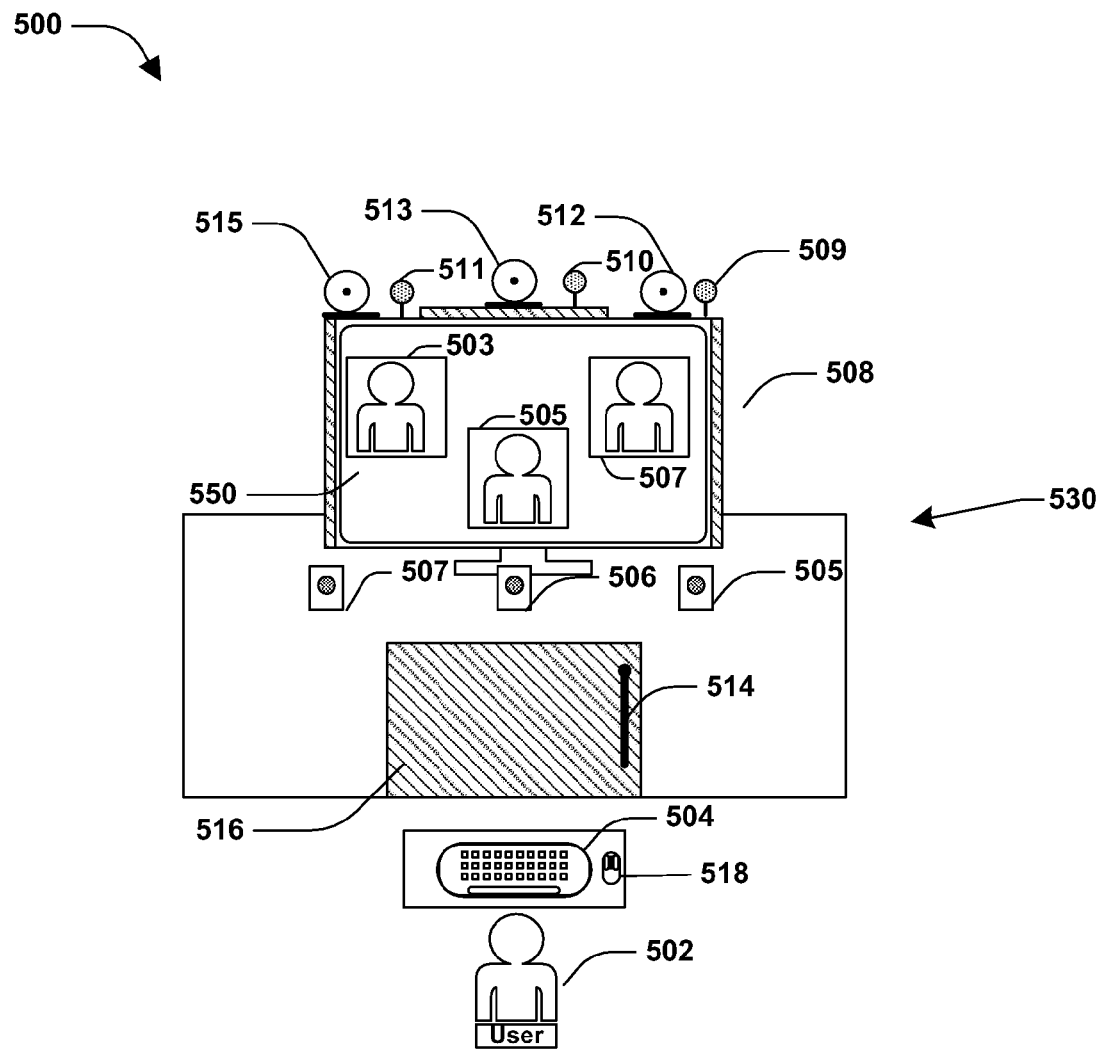
FIG. 5 is an illustration of a further alternative embodiment of an application of a multimedia conferencing system having a single display device.

A further alternative embodiment is depicted in FIG. 5, in which there is an illustrated orientation 500. The device 530 comprises a display 550 on which image data output from users 503, 505, and 507 is mapped and displayed in a window format on a single display 550. Each user visual output signal is mapped to a window.

Device 530 further comprises user 502 input devices: microphones 509, 510, and 511; tablet 516; stylus 514; keyboard 504; mouse 518; and cameras 515, 512, and 513. The user input devices produce output signals that are oriented to other remote users (503, 505, and 507) output devices (monitors, speakers, etc.). For example user 507 may orient the user 502 output signals from microphone 510 and camera 512. These output signals may be oriented to a monitor and speaker on user 507 device, according to an orientation plan.

Device 530 also comprises user 502 output devices: speakers 505, 506, and 507; and display 550. These output devices may be oriented to a remote user's 503, 505, and 507 output signal to provide for audio or visual MMC experience. Depending upon the orientation, a user may experience a semi-immersive environment where user 502 will be able to detect if user 507 is speaking towards user 502 or towards another remote user, such as 505. This may occur by lighting effects, directional sound, and/or visual notification of a user's head turning towards the monitor (representing the user) that the user is speaking with.

Figure 6:
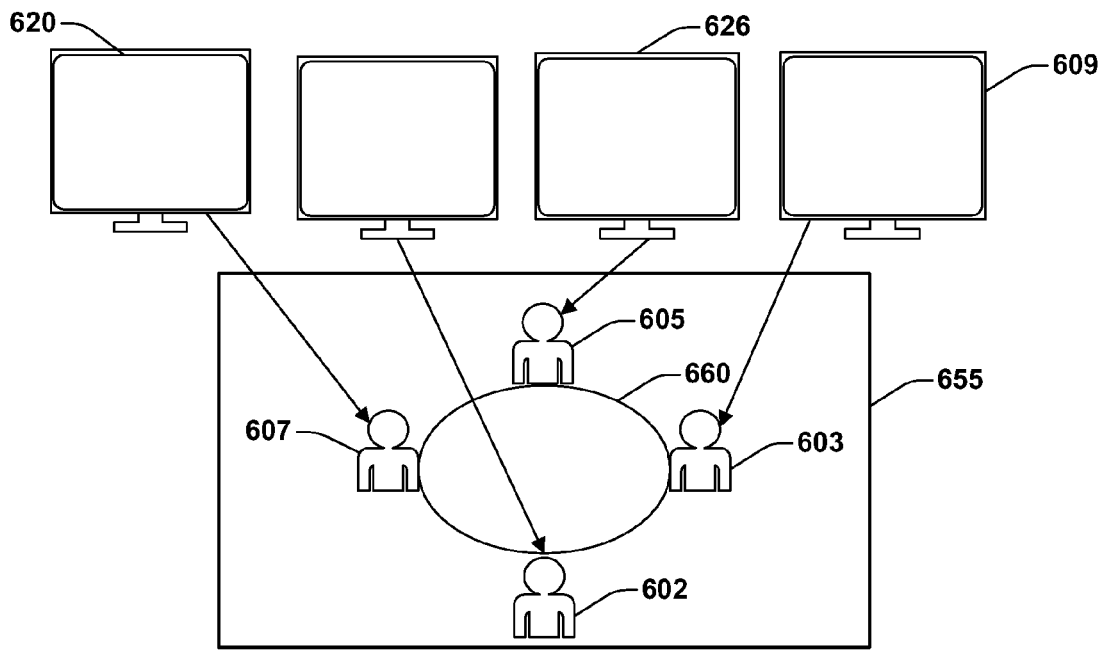
FIG. 6 is an illustration of a multimedia conference.

Orientation of image and sound data produced from users will be devised according to an orientation plan which configures signals from users' inputs and outputs to reflect each remote user's position in the MMC environment and conforms the signals to users' inputs and outputs. Referring to FIG. 6, there is illustrated a depiction of a MMC with four users 602, 603, 605, 607. Outputs, displayed in FIG. 6 as visual displays, are disposed as if users 602, 603, 605, 607 were present in one location 655 around a conference table 660.

Figure 7:
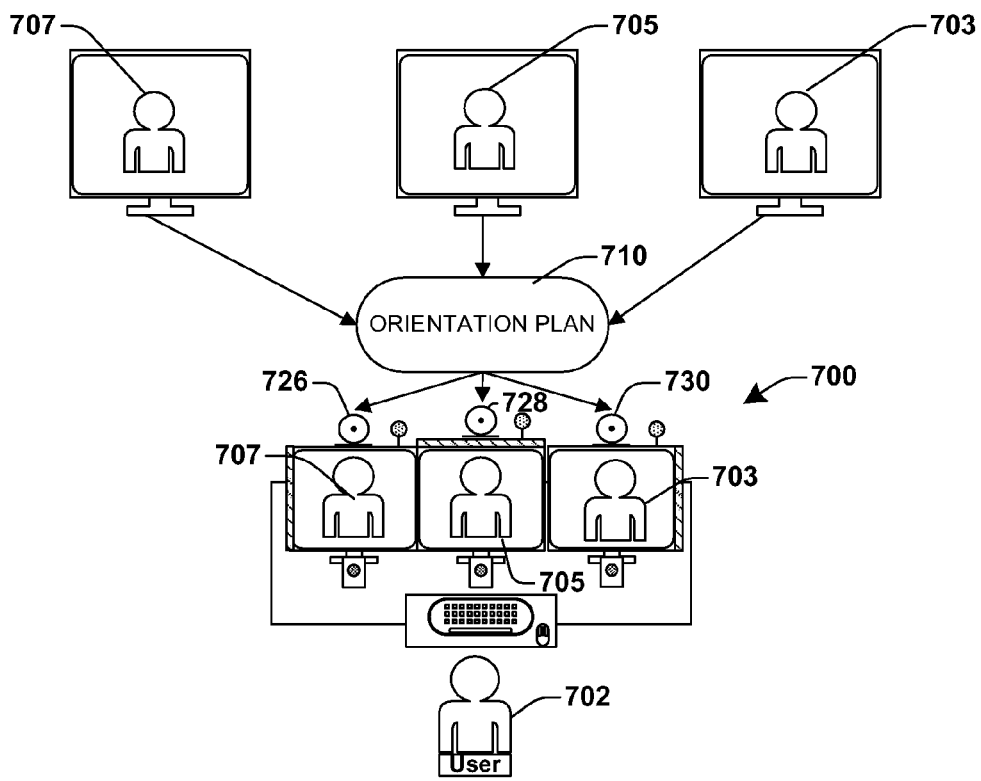
FIG. 7 is a component block diagram illustrating an exemplary system for conducting a multimedia conference between locations for use by two or more participants.

FIG. 7 illustrates four users 702, 703, 705, and 707 participating in a multimedia conference (MMC). Each user is configured with at least one input device, for example, keyboard, stylus, mouse, tablet, camera, and/or microphone. Each user's input device produces an output signal that may map to other remote users' (within the MMC) output devices (e.g. monitor, speaker, etc.) by means of an orientation plan 710. When users 702, 703, 705, and 707 begin participating in the MMC, an orientation plan 710 is created. The orientation plan 710 may be created on a server, a host computer, or any other appropriate location for creating, storing, and executing an orientation plan. The orientation plan configures a user device (combination of input devices and output devices) by determining how a user participates with other users (spatial orientation, available hardware, determining whom conversation is directed towards, etc.).

In one embodiment, an orientation plan 710 is created involving each user 702, 703, 705, and 707. Each user participates in the MMC by communicating with a central server. Users 702, 703, 705, 707 may send information to the server. The information may include hardware devices the user has available (number of monitors, number of speakers, presence of a tablet or stylus, etc.) and the number of users at the user device. A determination is made as to the spatial relationship (e.g. where each user is located in proximity to another user) between users 702, 703, 705, and 707. The spatial relationship between users 702, 703, 705, 707 may be specified according to one or more user's relative position in relation to other users within the multimedia conference. In another embodiment the spatial relationship between users 702, 703, 705, 707 may be specified by a plan-generating component. In a further embodiment, the spatial relationship between users may be specified according to a predetermined configuration.

One aspect that may vary among embodiments of these techniques relates to the manner in which the orientation plan 710 is devised. In one embodiment, the orientation plan 710 may be devised according users' preference, where users determine the position at which they are "seated" in the MMC (user 703 specifies the position of being on the right of user 702, across from user 707, and to the left of 705) and plan 710 orients their position accordingly for video and/or audio output. For example, audio output signals from user 703 on the right will map to the speaker on the right of user 702. In another embodiment, the orientation plan may be devised according to a single or "host". In a still further embodiment, the orientation plan 710 may be devised according to a network program. The plan 710 may be devised manually or automatically.

Once the spatial relationship of the users is created, output signals from input devices of other remote users are mapped to other remote users' output devices. One mapping may comprise remote users' 703, 705, and 707 output signals being mapped to user's 702 output devices (monitor, speaker, lighting system, etc.). This same mapping may be done for each user (703, 705, and 707). This may be accomplished by matching the appropriate output signal with the appropriate user device, for example, audio signals from user on the left to left speaker, video from user on the left to left monitor, etc., corresponding to the spatial relationship within the orientation plan 710. For example, the device 700 of user 702 comprises three cameras, left camera 726, middle camera 728, and right camera 730. The orientation plan 710 may specify that user 702 is to the left of user 703, to the right of user 707, and in front of user 705. The orientation plan 710 may map the output signal from user's 702 camera 730 (input device) to user's 703 monitor (output device). The orientation plan 710 may also map the output signal from user's 702 camera 728 (input device) to user 705 monitor (output device). The orientation plan 710 may also map the output signal from user's 702 camera 726 (input device) to user 707 monitor (output device).

The orientation plan 710 maps output signals to input signals to provide an orientation of image and sound data. The orientation reflects each remote user's position within the MMC environment. Each user will experience a MMC environment that provides a semi-immersive experience by means of one user device (group of input devices, output devices).

In one embodiment, the orientation plan may determine and adjust the output signals to a specific remote user based upon at least one criteria, for example, bandwidth, hardware configuration, resource availability, user posture, environmental conditions, and the like. For example, a user may have one display device (e.g. as illustrated by user 502 in FIG. 5) and one audio device (speaker), while there are three other remote users within the MCC. The orientation plan 710 may combine the audio output signals into one audio signal and map the one audio signal to the user's one speaker. Likewise, the orientation plan 710 may send the output visual signal of each participant in a lower resolution to the user with one monitor, because the user will have three windows that display a smaller resolution than a user with three large monitors. On the other hand, a user may have three speakers and three monitors, in which case the orientation plan 710 sends three separate audio signals and three separate high resolution visual signals to the user for a well-simulated experience. Further, where the number of speakers per user varies, the orientation plan 710 may generate a virtual space audio in which a virtual speaker corresponds to a user.

Figure 8:
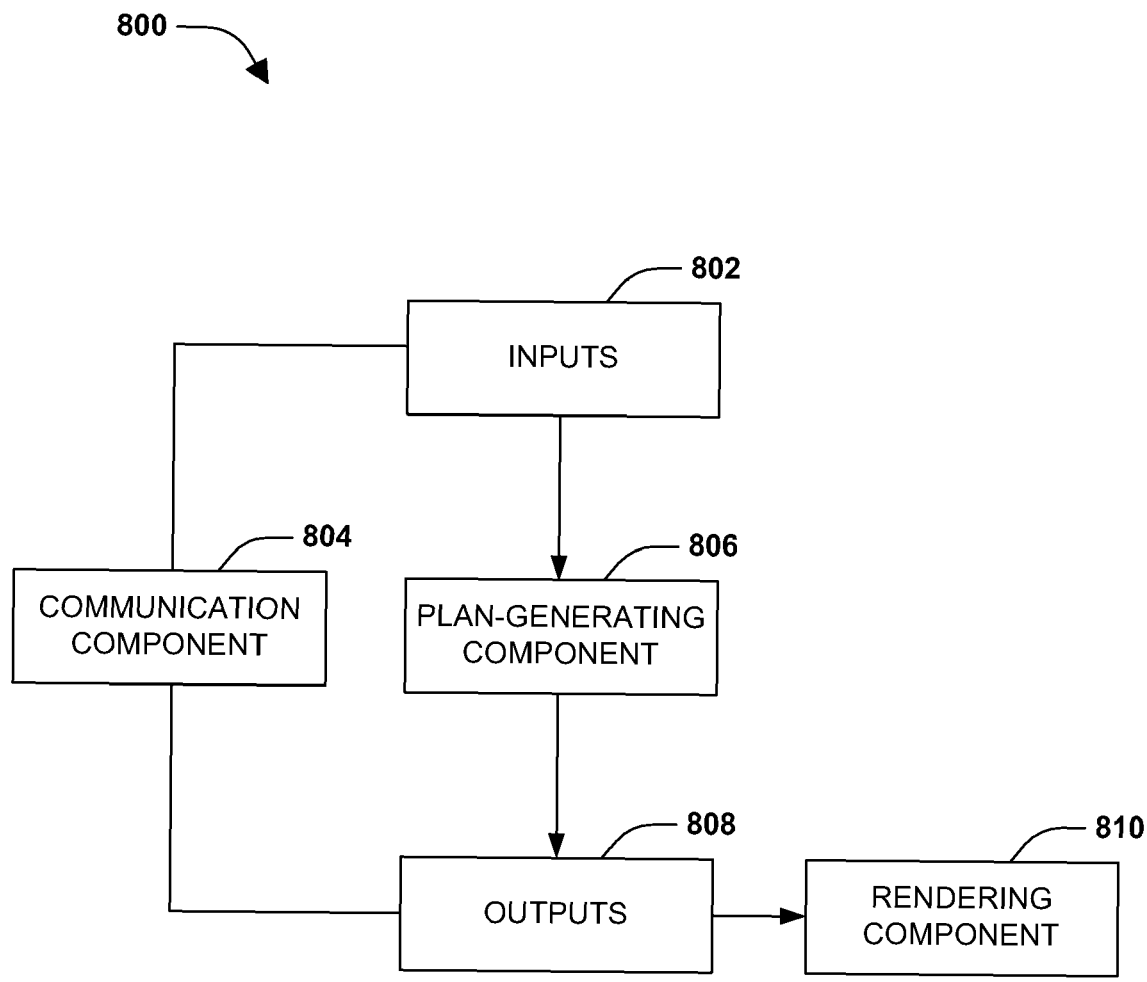
FIG. 8 is a component block diagram illustrating an exemplary system by which users may participate in a multimedia conference.

FIG. 8 illustrates a component block diagram of an exemplary system 800 by which users (e.g., 201, 202, 203, 204 FIG. 2) may participate in a multimedia conference. The exemplary system 800 includes at least one set of inputs 802 and one set of outputs 808.

A communication component 804 is configured to send data from at least one input of a user group to at least one other user group as an output signal. Communication component 804 processes information and signals received from input (such as visual data from a camera or audio data from a microphone) and allows exchange of information between input and output of user groups. Communication component 804 includes any suitable hardware, software, or both that operate to control and process signals, for example, a programmable logic device, a microcontroller, a microprocessor, or any suitable processing device or combination thereof.

Plan-generating component 806 comprises a wrapper configured to generate a plan and send the plan to users within the MMC to manage the experience of users within the MMC. In one embodiment, plan-generating component 806 may be provided to pre-configure a plan for use in the MMC and facilitate the performance of the MMC by users. In another embodiment, plan may be provided by input from users such that plan-generating component 806 may obtain files and information from users, and load and activate in system memory the plan to run the MMC. In a further embodiment, plan-generating component 806 may be configured to conclude the multimedia conference upon completion by the user groups. Those of ordinary skill in the art may devise many techniques for configuring the plan-generating component 806 to manage the multimedia conference while implementing the techniques discussed herein.

In the system 800 described herein, a rendering component 810 operatively connected to outputs 808 is provided. The rendering component 810, in one embodiment, is configured to perform visual rendering on output devices, such as monitors or displays. In another embodiment, the rendering component 810 is configured to further perform audio rendering of the MMC on outputs such as speakers, headphones or other audio devices. It can further be utilized to accept user input from devices such as a keyboard, a mouse, a microphone or other like input, for example. The inputs and outputs of users may be connected to a common hardware component, such as an I/O device, a hub, or any other device for connecting inputs and outputs.

Figure 9:
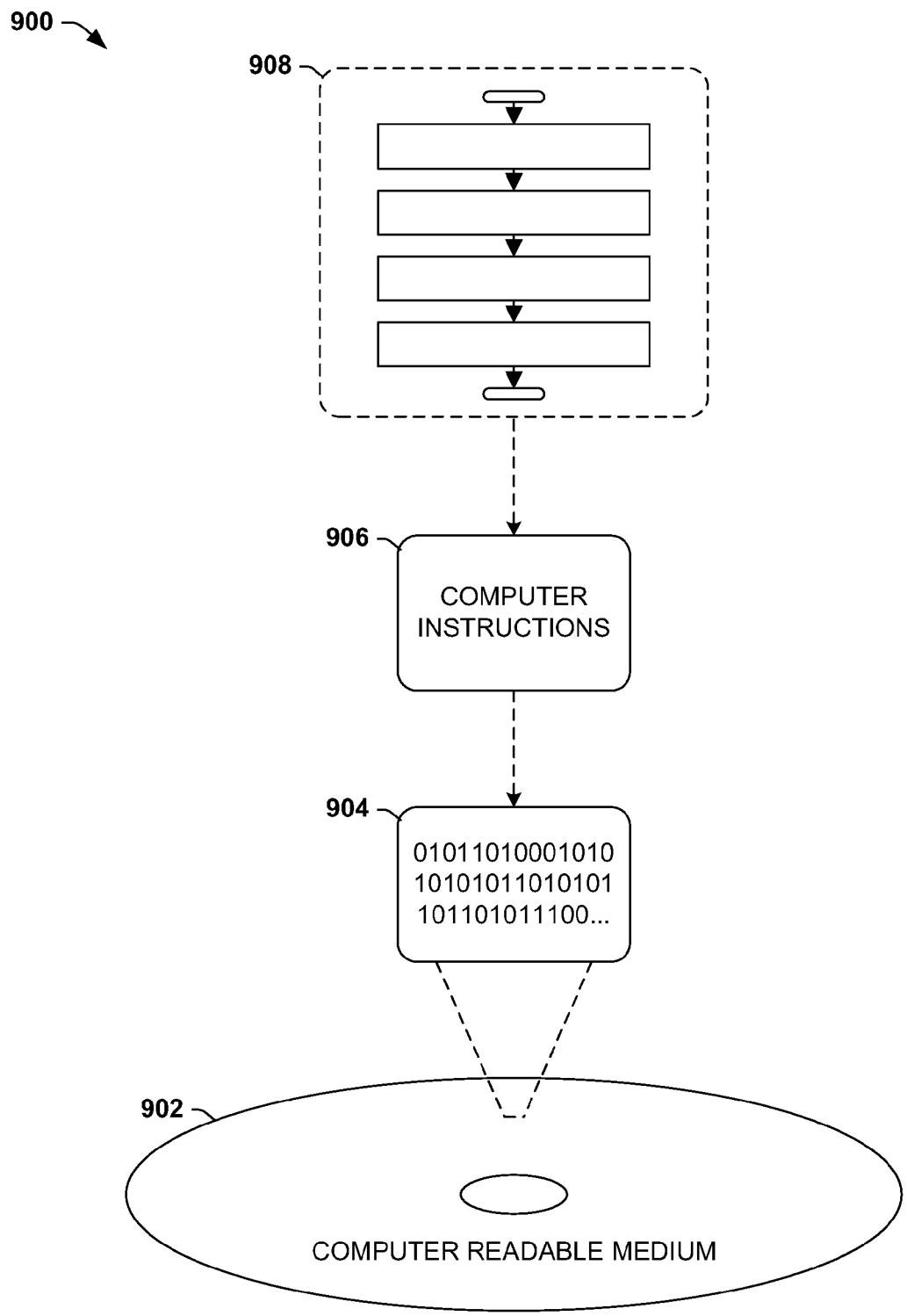
FIG. 9 is an illustration of a computer-readable medium comprising processor-executable instructions configured to apply one or more of the techniques presented herein.

Still another embodiment involves a computer-readable medium comprising processor-executable instructions configured to apply one or more of the techniques presented herein. An exemplary computer-readable medium that may be devised in these ways is illustrated in FIG. 9, wherein the implementation 900 comprises a computer-readable medium 902 (e.g., a CD-R, DVD-R, or a platter of a hard disk drive), on which is encoded computer-readable data 904. This computer-readable data 904 in turn comprises a set of computer instructions 906 configured to operate according to one or more of the principles set forth herein. In one such embodiment, the processor-executable instructions 906 may be configured to perform a method for orienting a multimedia conference among users, such as the exemplary method 100 of FIG. 1, for example. In another such embodiment, the processor-executable instructions 906 may be configured to implement a system for enabling users to participate in a multimedia conference 908, such as the exemplary system 800 of FIG. 8, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
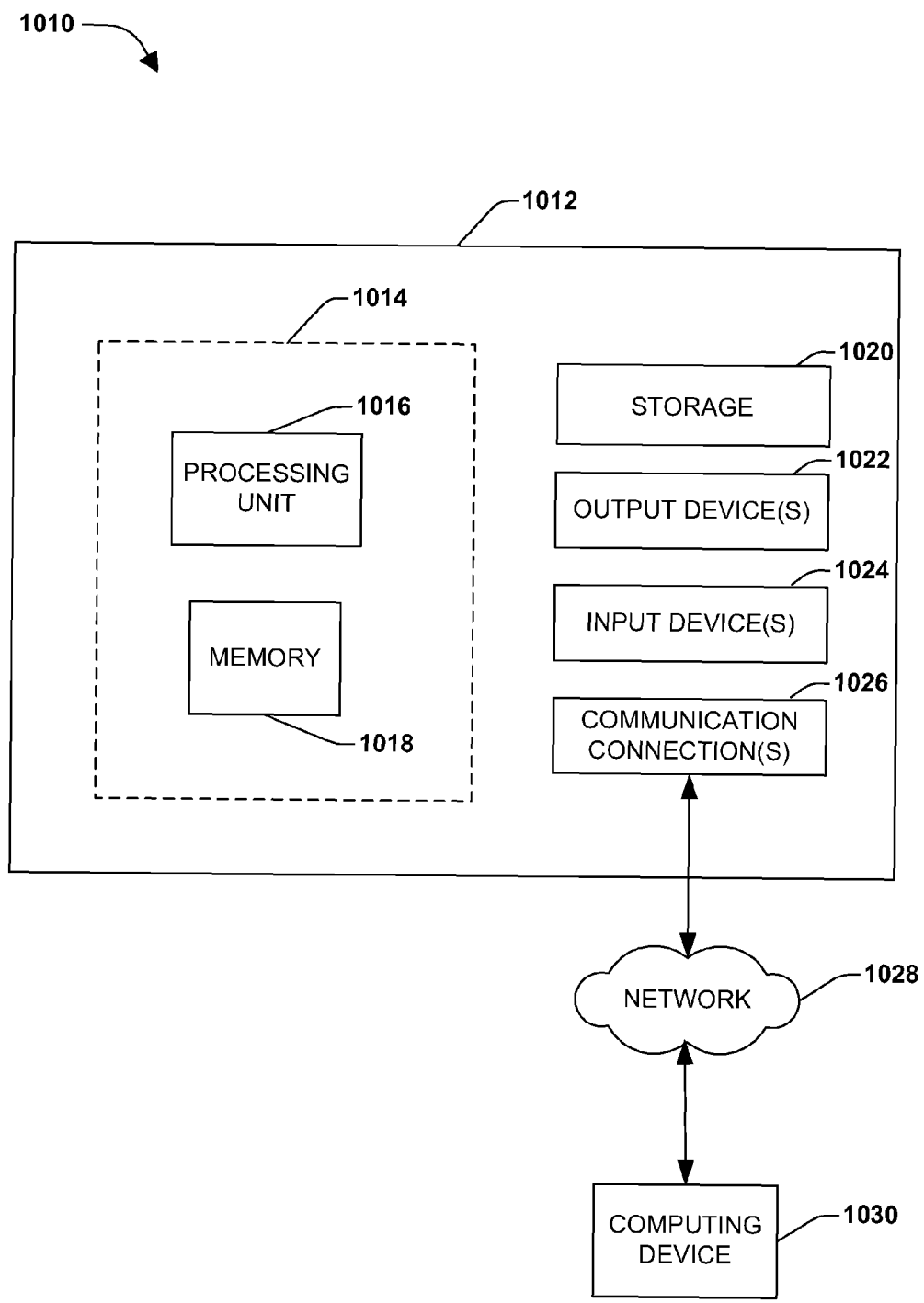
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described are not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Users' as used herein generally means one or more users, and not necessarily all of the users engaging in a particular activity concurrently.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for orienting a multimedia conference among at least two remote users, comprising:
    determining a number of remote users participating in the multimedia conference, respective remote users associated with at least one input device configured to generate an output;
    devising an orientation plan based upon the determined number of users, wherein the orientation plan is configured to provide an orientation of the outputs associated with respective remote users on at least one output device associated with at least one remote user; and
    linking the respective outputs with the at least one output device based upon the orientation plan.

2. The method of claim 1, wherein devising comprises determining the at least one input device associated with the respective remote users and the at least one output device associated with the at least one remote user.

3. The method of claim 2, wherein the at least one input device comprises one or more of a camera, a microphone, a keyboard, a mouse, a stylus, and a tablet.

4. The method of claim 2, wherein the at least one output device comprises one or more of a speaker and a monitor.

5. The method of claim 1, wherein devising the orientation plan comprises specifying according to user input the relative orientation of the outputs associated with respective remote users on the at least one output device.

6. The method of claim 1, wherein devising the orientation plan comprises specifying by a plan-generating component the relative orientation of the outputs associated with respective remote users on the at least one output device.

7. The method of claim 1, wherein devising the orientation plan comprises specifying by a predetermined configuration the relative orientation of the outputs associated with respective remote users on the at least one output device.

8. The method of claim 1, wherein linking comprises:
    configuring the at least one output device associated with the at least one remote user to receive outputs associated with respective remote users; and
    rendering the outputs associated with respective remote users on the at least one output device according to the orientation plan.

9. The method of claim 1, comprising adjusting at least one controllable light associated with the respective remote users based upon the orientation plan.

10. The method of claim 1, wherein the orientation plan is devised by a network program.

11. The method of claim 1, comprising, upon linking the at least one output of respective remote users with the at least one input device of the at least one remote user, facilitating the multimedia conference with a common software user interface.

12. The method of claim 1, comprising:
    upon linking the at least one output of respective remote users with at least one input device of the at least one remote user, facilitating adjustment of at least one remote user based upon one or more of bandwidth, hardware configurations, and resource availability.

13. A system for enabling users to remotely participate in a multimedia conference, comprising:
    a communication component configured to send data from input devices associated with respective remote users to an output device associated with a first remote user; and
    a plan-generating component configured to determine a number of remote users participating in the multimedia conference and generate an orientation plan for orienting the data from the input devices on the output device, the orientation being a function of the number of remote users.

14. The system of claim 13, wherein the plan-generating component is configured to generate the orientation plan based upon user input.

15. The system of claim 14, wherein the plan-generating component is configured to receive one of more files from an input associated with a first user and generate an orientation plan based upon the received one or more files.

16. The system of claim 14, wherein the plan-generating component is configured to orient data associated with a first remote user on the output device based upon a preferred orientation of the first user.

17. The system of claim 13, wherein the plan-generating component comprises a processor configured to execute a network program, the network program configured to generate the orientation plan without user input.

18. The system of claim 13, comprising a rendering component configured to render data on the output device.

19. The system of claim 13, wherein the communication component is configured to adjust at least one controllable light associated with a remote users based upon the orientation plan generated by the plan-generating component.

20. A method for orienting a multimedia conference, comprising:
- determining a number of remote users participating in the multimedia conference, respective remote users associated with at least one input device configured to generate an output;
- devising an orientation plan based upon the determined number of users, wherein the orientation plan is configured to provide an orientation of the outputs associated with respective remote users on at least one output device associated with at least one remote user, wherein devising an orientation plan comprises:
  - determining the at least one input device associated with the respective remote users and the at least one output device associated with the at least one remote user;
    - the at least one input device comprising one or more of a camera, a microphone, a keyboard, a mouse, a stylus, and a tablet; and
    - the at least one output device comprising one or more of a speaker and a monitor; and
  - at least one of:
    - specifying according to user input the relative orientation of the outputs associated with respective remote users on the at least output device;
    - specifying by a plan-generating component the relative orientation of the outputs associated with respective remote users on the at least one output device; and
    - specifying by a predetermined configuration the relative orientation of the outputs associated with respective remote users on the at least one output device; and
- linking the respective outputs with the at least one output device based upon the orientation plan, wherein the linking comprises:
  - configuring the at least one output device associated with the at least one remote user to receive outputs associated with respective remote users; and
  - rendering the outputs associated with respective remote users on the at least one output device according to the orientation plan.

* * * * *